(12) United States Patent
Zagade et al.

(10) Patent No.: US 10,885,706 B2
(45) Date of Patent: Jan. 5, 2021

(54) SYSTEM AND METHOD FOR DESIGN OF ADDITIVELY MANUFACTURED PRODUCTS

(71) Applicant: Tata Consultancy Services Limited, Mumbai (IN)

(72) Inventors: Pramod Ramdas Zagade, Pune (IN); Purushottham Gautham Basavarsu, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 427 days.

(21) Appl. No.: 15/823,021

(22) Filed: Nov. 27, 2017

(65) Prior Publication Data
US 2018/0276889 A1 Sep. 27, 2018

(30) Foreign Application Priority Data
Mar. 22, 2017 (IN) .............................. 201721010130

(51) Int. Cl.
| | | |
|---|---|---|
| G06T 17/20 | (2006.01) | |
| G06F 30/17 | (2020.01) | |
| G06F 30/23 | (2020.01) | |
| B29C 64/386 | (2017.01) | |
| G06F 119/18 | (2020.01) | |

(52) U.S. Cl.
CPC .......... *G06T 17/205* (2013.01); *B29C 64/386* (2017.08); *G06F 30/17* (2020.01); *G06F 30/23* (2020.01); *G06F 2119/18* (2020.01); *Y02P 90/02* (2015.11)

(58) Field of Classification Search
CPC ..... G06T 17/205; B29C 64/386; G06F 30/23; G06F 30/17
USPC .............................................. 703/7
See application file for complete search history.

(56) References Cited

U.S. PATENT DOCUMENTS

| | | | | |
|---|---|---|---|---|
| 8,126,684 B2* | 2/2012 | Goel | ....................... | G06F 30/15 703/1 |
| 9,858,714 B2* | 1/2018 | Saito | ....................... | G06F 30/15 |
| 9,895,845 B2* | 2/2018 | Bheda | ................... | B29C 64/386 |

(Continued)

OTHER PUBLICATIONS

Ulu et al. "Enhancing the Structural Performance of Additively Manufactured Objects Through Build Orientation Optimization", Journal of Mechanical Design, ASME, 2015, pp. 1-9) (Year: 2015).*

(Continued)

*Primary Examiner* — Iftekhar A Khan
(74) *Attorney, Agent, or Firm* — Finnegan, Henderson, Farabow, Garrett & Dunner LLP (57) ABSTRACT

A system and method for obtaining topologically optimized structure in additive manufacturing. A finite element mesh of a standard shape geometry encompassing desired structure to be optimized with a design objective and orthotropic properties of material arising out of a selected material and selected additive manufacturing process to be used for manufacturing. An iterative topology optimization is carried out wherein the process includes simulation of loading requirements, design constraints and the boundary condition. The performance evaluation process uses a finite element analysis framework to obtain the factor of safety between two consecutive iterations based on the anisotropic properties of the material. The process will achieve a minimal factor of safety and a best suitable build orientation of the design.

8 Claims, 5 Drawing Sheets

(56) References Cited

U.S. PATENT DOCUMENTS

| | | | | |
|---|---|---|---|---|
| 10,112,731 B2* | 10/2018 | Rodrigues | | G06F 30/23 |
| 10,252,336 B2* | 4/2019 | Buller | | B28B 17/0081 |
| 10,353,378 B2* | 7/2019 | Shapiro | | G05B 19/4099 |
| 2003/0079188 A1* | 4/2003 | McConaghy | | G06F 30/36 |
| | | | | 716/119 |
| 2008/0279448 A1* | 11/2008 | Schafer | | G01N 15/1459 |
| | | | | 382/154 |
| 2008/0300831 A1* | 12/2008 | Taggart | | G06F 30/17 |
| | | | | 703/1 |
| 2009/0164178 A1* | 6/2009 | Pydimarry | | G06F 30/15 |
| | | | | 703/1 |
| 2010/0058257 A1* | 3/2010 | Park | | G06F 30/00 |
| | | | | 716/132 |
| 2010/0262406 A1* | 10/2010 | Goel | | G06F 30/23 |
| | | | | 703/2 |
| 2015/0054204 A1* | 2/2015 | Tseliakhovich | | B29C 64/153 |
| | | | | 264/489 |
| 2015/0269282 A1* | 9/2015 | Nelaturi | | G06F 30/17 |
| | | | | 700/98 |
| 2015/0269289 A1* | 9/2015 | Kim | | G06F 30/20 |
| | | | | 703/6 |
| 2015/0269290 A1* | 9/2015 | Nelaturi | | G06T 17/10 |
| | | | | 703/6 |
| 2016/0096318 A1* | 4/2016 | Bickel | | G06F 30/20 |
| | | | | 264/40.1 |
| 2016/0140269 A1* | 5/2016 | Wang | | G06F 30/23 |
| | | | | 703/1 |
| 2017/0009036 A1* | 1/2017 | Xie | | B33Y 70/00 |
| 2017/0014169 A1* | 1/2017 | Dean | | A61B 17/8071 |
| 2017/0161405 A1* | 6/2017 | Ishizuka | | G06F 30/23 |
| 2017/0343984 A1* | 11/2017 | Czinger | | B33Y 50/00 |
| 2017/0372480 A1* | 12/2017 | Anand | | G06T 19/20 |
| 2018/0046732 A1* | 2/2018 | Bergin | | G06F 30/17 |
| 2018/0052445 A1* | 2/2018 | Shapiro | | G05B 19/4099 |
| 2018/0247004 A1* | 8/2018 | Allen | | G06T 19/00 |
| 2018/0299868 A1* | 10/2018 | Grafen | | G06T 17/205 |
| 2019/0001657 A1* | 1/2019 | Matusik | | B33Y 50/00 |

OTHER PUBLICATIONS

Brackett et al. ("Topology Optimization for Additive Manufacturing", 2011, Loughborough University, pp. 348-362) (Year: 2011).*

Mirzendehdel et al ("Support structure constrained topology optimization for additive manufacturing", Computer-Aided Design 81 (2016) 1-13) (Year: 2016).*

Zegard et al. ("Bridging topology optimization and additive manufacturing", Struct Multidisc Optim (2016) 53:175-192) (Year: 2016).*

Brackett et al. ("Topology Optimization for Additive Manufacturing", Loughborough University, 2011, pp. 348-362) Year: 2011).*

Amir et al. ("Efficient Use of Iterative Solvers in Nested Topology Optimization", Technical University of Denmark, 2009, pp. 1-15) (Year: 2009).*

Ulu, E. et al. (Oct. 2015). "Enhancing the Structural Performance of Additively Manufactured Objects Through Build Orientation Optimization," *Journal of Mechanical Design*, vol. 137; 12 pages.

* cited by examiner

SYSTEM AND METHOD FOR DESIGN OF ADDITIVELY MANUFACTURED PRODUCTS

PRIORITY CLAIM

This U.S. patent application claims priority under 35 U.S.C. § 119 to India Application No. 201721010130, filed on Mar. 22, 2017. The entire contents of the abovementioned application are incorporated herein by reference.

TECHNICAL FIELD

The embodiments herein generally relates to a system and method for obtaining topologically optimized structure in additive manufacturing and, more particularly, determining optimal shape and build orientation of a structure having anisotropic properties induced due to additive manufacturing.

BACKGROUND

Today, additive manufacturing is a rapidly emerging technology to produce parts having complex shapes. It uses layer-by-layer deposition of material to build three dimensional structures. Ideally there are no limitations on the geometry of parts that can be produced using additive manufacturing technology. It offers a great freedom to designers to design products of any complex shape with least possible amount of material and target of minimum weight to achieve required functionality. However, in metallic applications, layered structure leads to anisotropy in the material with different mechanical properties along various directions. The difference in mechanical properties such as yield strength along built and lateral directions is significant. It imposes constraints on the designers, as they have to consider strength in the weakest direction as design norm while evaluating safety of the designed structure. On the other hand, heat treatments are often essential and used for these parts to homogenize the properties. Parts are heated to a higher temperature and held for some time to introduce microstructural changes in the part and are then cooled in a controlled environment. As a result of heat treatment, microstructural changes take place. It reduces the inhomogeneity of properties in the part, but most of the time at the expense of strength and yet not fully alleviating anisotropy. Addressing anisotropic properties may also require decisions on optimum build orientation while manufacturing the part at the design stage itself. Existing guidelines on how the part should be oriented while manufacturing additively are based on dimensions of the part, support structure design and machine specifications.

Traditionally, design optimization is performed with a computer system and generally divided into sizing, shape and topology. The application of topology optimization is the best suited technique to design such parts having minimal manufacturing constraints such as those produced using additive manufacturing. Topology optimization used for designing the structural part should consider the anisotropic properties it may possess after being produced through additive manufacturing.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for obtaining topologically optimized structure manufactured by additive manufacturing processes.

In one aspect, a system for obtaining topologically optimized structure to be manufactured by additive manufacturing processes. The system comprises a processor, a memory communicatively coupled to the processor and the memory contains instructions that are readable by the processor, a receiver module is configured to receive a finite element mesh of a standard shape geometry encompassing desired structure to be optimized in accordance with at least one design objective and orthotropic properties of material arising out of a selected material and selected additive manufacturing process to be used for manufacturing the designed structure, an application module is configured to apply an iterative topology optimization of the designing structure, wherein each iteration of the topology optimization comprising of simulating one or more loading requirements, one or more design constraints and one or more boundary conditions under which the designing structure is designed and optimized, an evaluation module is configured to evaluate the designing structure resulted from application of the iterative topology optimization using finite element analysis framework to obtain a predefined factor of safety based on the anisotropic properties of the material arising out of the selected additive manufacturing process, wherein the predefined factor of safety condition is defined as a substantially small difference in comparison with evaluated factor of safety and a modification module is configured to modify the state of the finite element iteratively according to one or more changes of the factor of safety between two consecutive iterations of the iterative topology optimization of the designing structure and obtaining an optimal designing structure when the entire structure has a minimal factor of safety equivalent to a predefined factor of safety.

In another aspect, a method for obtaining topologically optimized structure in additive manufacturing. The method comprises receiving a finite element mesh of a standard shape geometry encompassing desired structure to be optimized in accordance with at least one design objective and orthotropic properties of material arising out of a selected material and selected additive manufacturing process to be used for manufacturing the designed structure applying an iterative topology optimization of the designing structure, wherein each iteration of the topology optimization comprising of simulating one or more loading requirements, one or more design constraints and one or more boundary conditions under which the designing structure is designed and optimized, evaluating the designing structure resulted from application of the iterative topology optimization using finite element analysis framework to obtain a predefined factor of safety based on the anisotropic properties of the material arising out of the selected additive manufacturing process, wherein the predefined factor of safety condition is defined as a substantially small difference in comparison with evaluated factor of safety modifying the state of the finite element iteratively according to one or more changes of the factor of safety between two consecutive iterations of the iterative topology optimization of the designing structure and obtaining an optimal designing structure when the entire structure has a minimal factor of safety equivalent to a predefined factor of safety.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
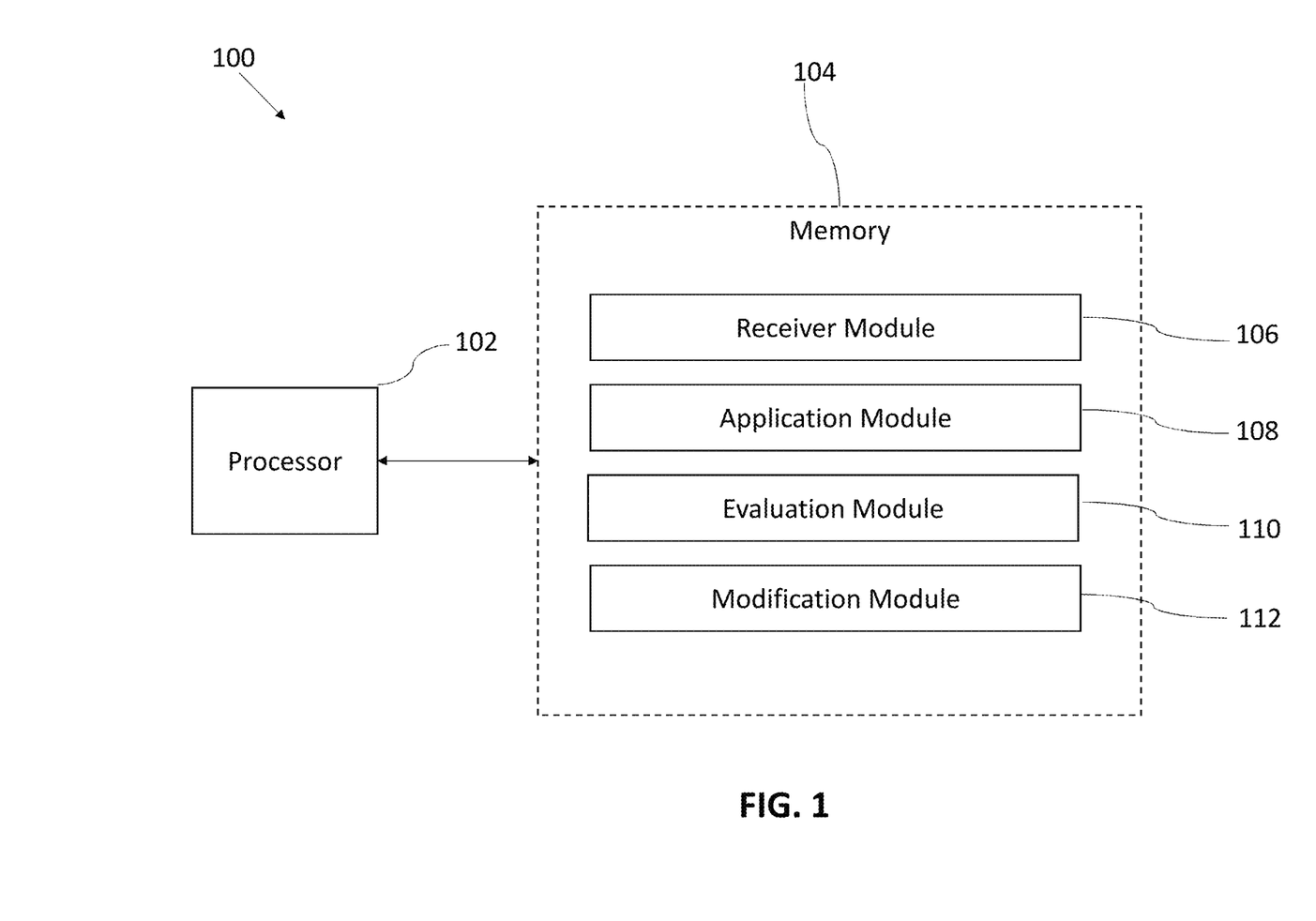
FIG. 1 illustrates a system for obtaining topologically optimized structure in additive manufacturing according to an embodiment of the present disclosure.

Referring FIG. 1, a system 100 for obtaining topologically optimized structure in additive manufacturing. The system 100 comprising a processor 102, a memory 104 communicatively coupled to the processor 102, a receiving module 106, an application module 108, an evaluation module 110 and a modification module 112.

In the preferred embodiment, the memory 104 contains instructions that are readable by the processor 102.

In the preferred embodiment, the receiver module 106 is configured to receive a finite element mesh of a standard shape geometry encompassing desired structure to be optimized in accordance with at least one design objective and orthotropic properties of material arising out of a selected material and selected additive manufacturing process to be used for manufacturing the designed structure.

In the preferred embodiment, the application module 108 is configured to apply an iterative topology optimization of the designing structure, wherein each iteration of the topology optimization comprising of simulating one or more loading requirements, one or more design constraints and one or more boundary conditions under which the designing structure is designed and optimized. In the application module 108 the iteration topology optimization has been performed with Bidirectional Evolutionary Structural Optimization (BESO) process. It would be appreciated that the said disclosure is not limited to the BESO process and can be performed with other topology optimization process.

In the preferred embodiment, initially directional properties are assigned to the domain of interest which is a conservative design. A factor of safety concept is being used for structural analysis. The factor of safety is used to determine elemental sensitivity numbers. It is then converted to the nodal sensitivity numbers for the given domain. Sometimes, topology optimization is sensitive to the mesh sizes. Hence, a mesh-independency filter using nodal variables is used to determine the utility of the elements. These utility numbers then used as basis and for addition or elimination of elements.

Further, it is observed that the output part of structure of conventional process of additive manufacturing will have anisotropy in Young's modulus. Therefore, anisotropy may affect linear deformation behavior in the respective directions. This needs to be accounted for along with anisotropy in the yield strengths in the output part of additive manufacturing. The factor of safety based criterion is utilized for defining material removal/addition and termination criteria. For two dimensional transversely isotropic material, the factor of safety (FOS) is determined using Tsi-Hill criteria:

$$FOS = \frac{1}{\left\{\left(\frac{\sigma_1}{\overline{\overline{\sigma_1}}}\right)^2 + \left(\frac{\sigma_2}{\overline{\overline{\sigma_2}}}\right)^2 + \left(\frac{\sigma_{12}}{\overline{\overline{\sigma_{12}}}}\right)^2 - \frac{\sigma_1 \cdot \sigma_2}{\overline{\tau_1}^2}\right\}^{1/2}}$$

$\sigma_2$ is the stress in build direction
$\sigma_1$ is the stress in other direction
$\overline{\sigma}i$ is the yield stress in the respective direction Further, if the factor of safety is greater than or equal to the predefined minimum factor of safety then element removal and addition activities is activated. The elements are soft killed, by simply reducing their stiffness to a very low value.

In the preferred embodiment, the evaluation module 110 is configured to evaluate the designing structure resulted from application of the iterative topology optimization using finite element analysis framework to obtain a minimal predefined factor of safety based on the anisotropic properties of the material arising out of the selected additive manufacturing process, wherein the predefined factor of safety condition is defined as a substantially small difference in comparison with evaluated factor of safety. After the one or more iterations once the predefined criteria is met the process is terminated and the optimized structure is saved.

It would be appreciated that the topology optimization exercise can be repeated with a set of material properties which may be the result of various additive manufacturing build directions. A predefined criteria for selecting best build direction are based on weight of structure, failure criteria etc. Further, the one or more build orientations are ranked to choose best suitable build orientation when each of them evaluated against the one or more criteria for example, but not limited to, minimum volume, weight or deflection etc.

Figure 2:
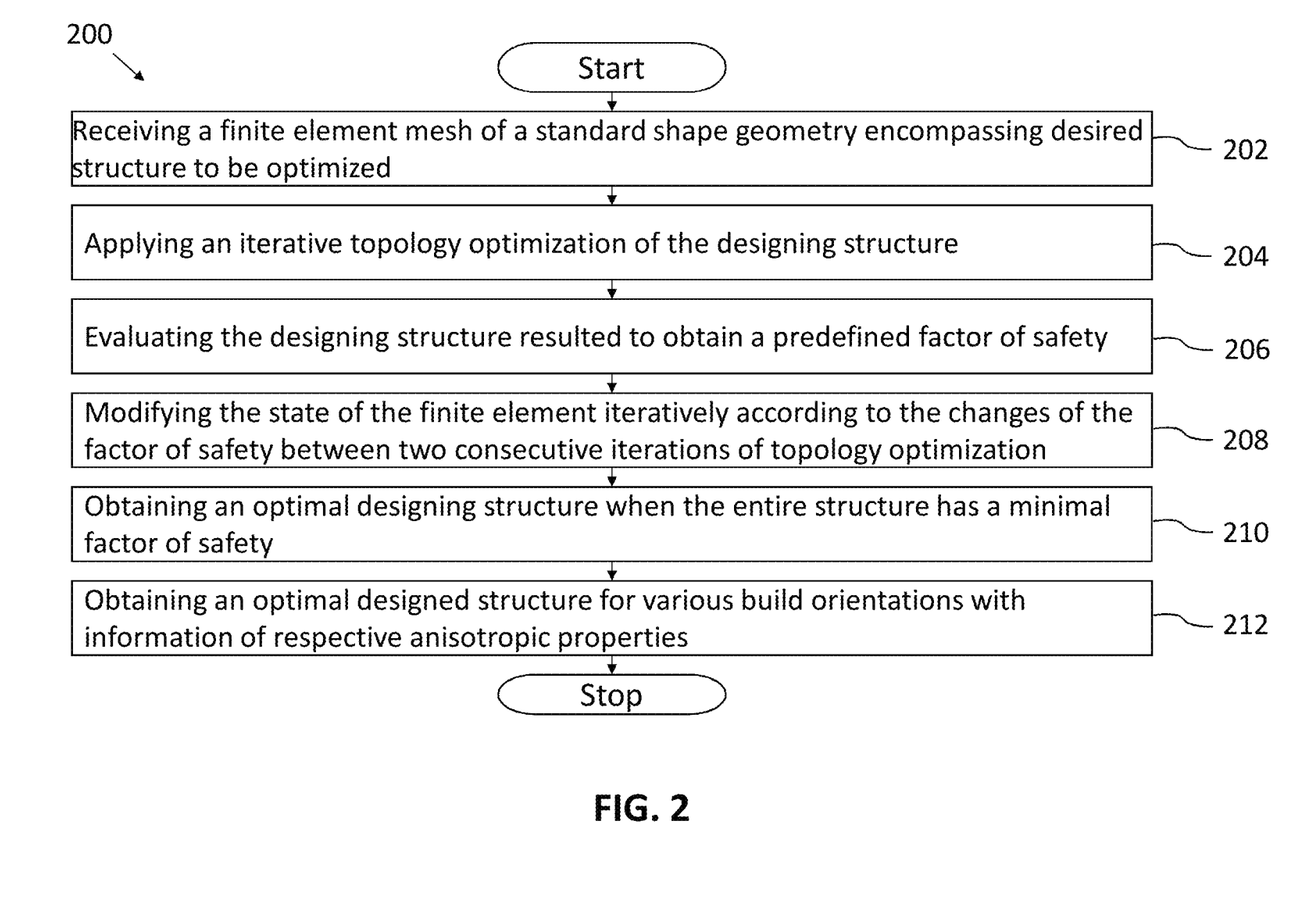
FIG. 2 illustrates a method for obtaining topologically optimized structure in additive manufacturing according to an embodiment of the present disclosure.

Referring FIG. 2, a method 200 for obtaining topologically optimized structure in additive manufacturing.

At step 202, where the process receives a finite element mesh of a standard shape geometry encompassing desired structure to be optimized in accordance with at least one design objective and orthotropic properties of material arising out of a selected material and selected additive manufacturing process to be used for manufacturing the designed structure.

At step 204, where the application module applies an iterative topology optimization of the designing structure, wherein each iteration of the topology optimization comprising of simulating one or more loading requirements, one or more design constraints and one or more boundary conditions under which the designing structure is designed and optimized.

At step 206, where the evaluation module evaluates the designed structure resulted from application of the iterative topology optimization using finite element analysis framework to obtain a predefined factor of safety based on the anisotropic properties of the material arising out of the selected additive manufacturing process, wherein the predefined factor of safety condition is defined as a substantially small difference in comparison with evaluated factor of safety.

At step 208, where the process modifies the state of the finite element iteratively according to one or more changes of the factor of safety between two consecutive iterations of the iterative topology optimization of the designing structure.

At final step 210 and 212, where the process obtains an optimal design structure for one or more build orientations with information of respective anisotropic properties. The optimal design structure is selected when the entire structure has a minimal factor of safety equivalent to a predefined factor of safety. Further, the one or more build orientations are ranked to choose the best suitable build orientation when each of them evaluated against the one or more criteria for example minimum volume, weight or deflection etc.

In an example, the proposed method is explained with the help of three representative implementations:

a) A two dimensional design of bracket structure to support vertical load;
b) A control lever arm design; and
c) A three dimensional design of bracket structure. For each of the case study, anisotropic properties of material were assumed as follows.

| Property | Build up direction | In layer direction |
|---|---|---|
| Young's Modulus | 151 GPa | 156 GPa |
| Yield Strength | 1170 Mpa | 1033 MPa |

Figure 3:
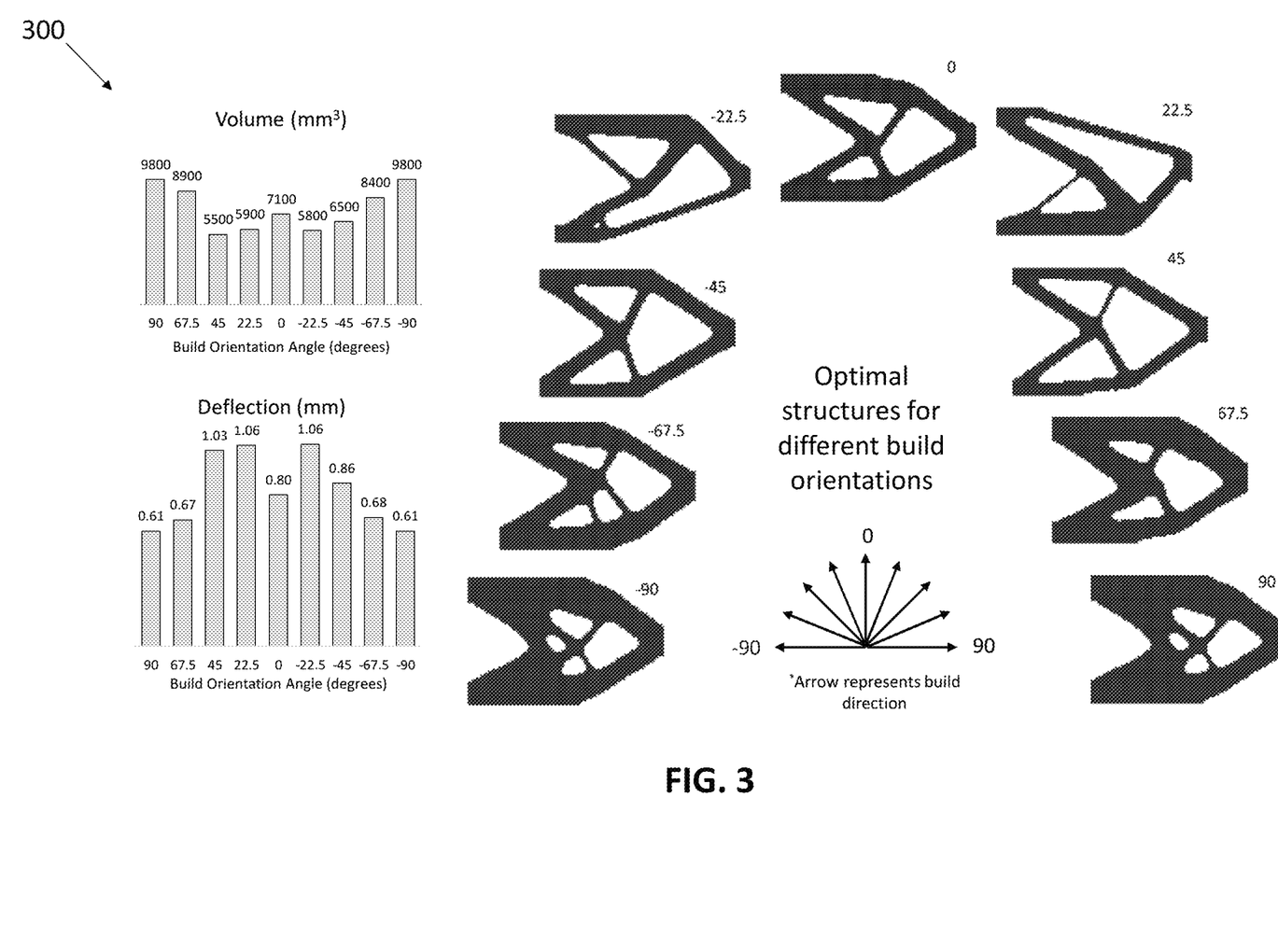
FIG. 3 illustrates an example of the optimal structures and key result variables obtained through BESO for directional properties according to an embodiment of the present disclosure.

Referring FIG. 3, an example, which illustrates the results after applying proposed method. It shows resulting optimal structures for assumption of varying build direction. E.g. if considered 0° build direction, it corresponds to vertical direction coinciding with build direction and properties are assumed accordingly. Topology optimization algorithm with anisotropic properties and factor of safety based criteria for evolution of structure resulted in an optimal structure. Then it is assumed that build direction is changed and rotated through 22.5°. Material anisotropy parameters are then calculated using appropriate mathematical transformation and corresponding optimal structure is obtained. Such exercise is repeated for 9 representative directions and corresponding optimal structures are shown in the figure. In each case key parameters such as final structure volume and deflection observed after applying load are shown in the form of bar chart. Designer can decide the best possible structure and choose suitable build direction after examining various final shapes and corresponding values of volume and deflection.

Figure 4:
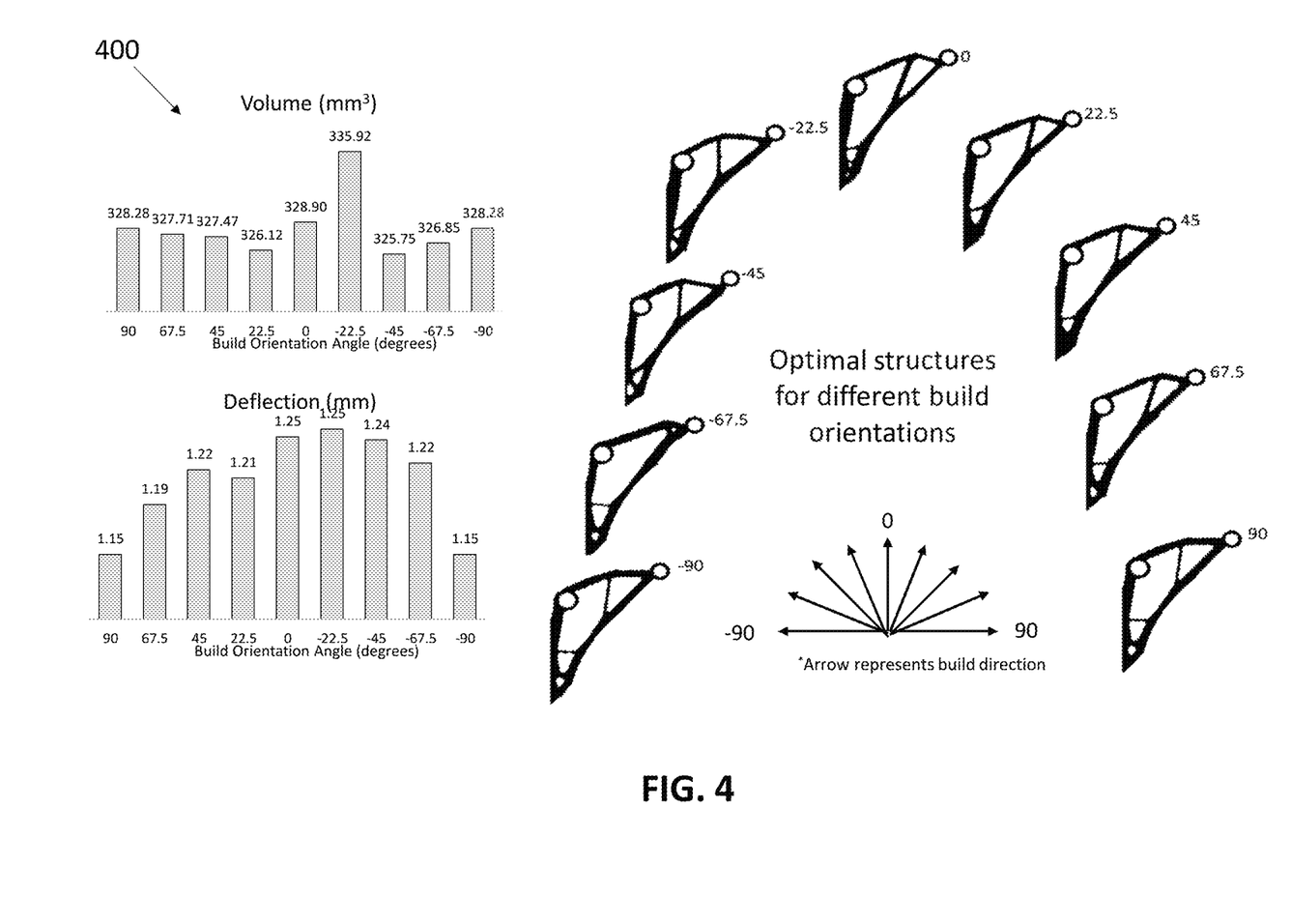
FIG. 4 illustrate an example of a control arm optimal structure and key result variables with varying build orientations according to an embodiment of the present disclosure.

Similar approach is repeated for another case study of control arm design, wherein more than one load points are considered. Under such scenario optimal structures in case of varying build direction and corresponding key parameters are shown in FIG. 4.

Figure 5:
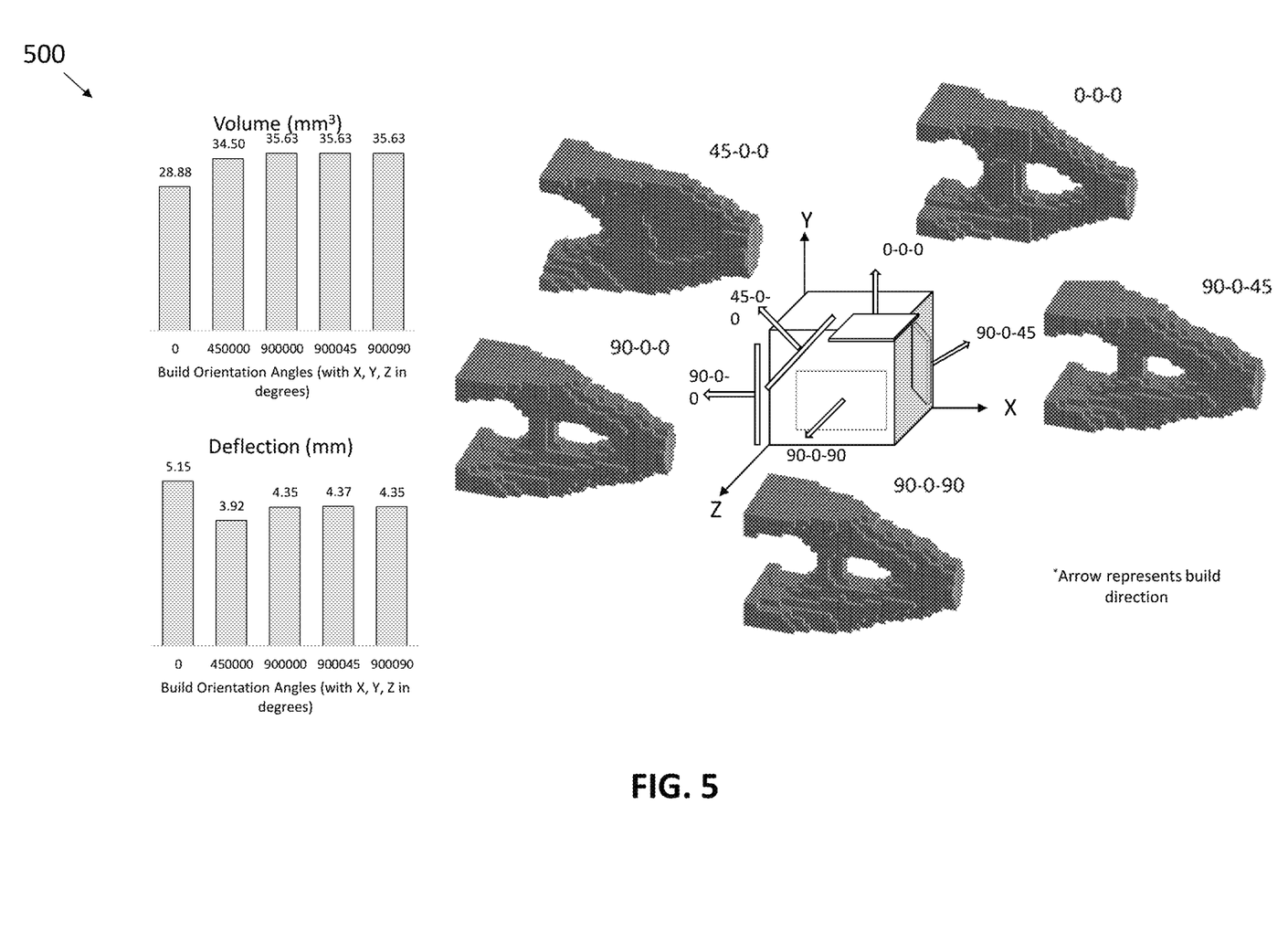
FIG. 5 illustrate an example of three dimensional optimal structure and key result variables of bracket for varying build orientations according to embodiment of the present disclosure.

Referring FIG. 5, illustrates an example of three dimensional optimal structure and key result variables of bracket for varying build orientations. Herein the proposed method can be used for optimization of three dimensional structures as well. In this case build direction variation is considered with respect to all three directions and corresponding results are reported.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method to obtain a topologically optimized structure in additive manufacturing. A finite element mesh of a standard shape geometry encompassing desired structure to be optimized with a design objective and orthotropic properties of material arising out of a selected material and selected additive manufacturing process to be used for manufacturing. An iterative topology optimization is carried out wherein the process includes simulation of loading requirements, design constraints and the boundary condition. The performance evaluation process uses a finite element analysis framework to obtain the factor of safety between two consecutive iterations based on the anisotropic properties of the material. The process will achieve a minimal factor of safety and a best suitable build orientation of the design.

The embodiments of present disclosure herein addresses unresolved problem of anisotropy being introduced in the part of design structure while carrying additive manufacturing process. The anisotropy is commonly observed in metallic part of the design structure. The difference in mechanical properties such as yield strength along built direction is significant. It may lead in heavier parts as such designs are overdesigned in other directions. On the other hand heat treatment are often suggested and used for such parts so as to have isotropic properties. However, the heat treatment develops microstructural changes which leads to homogenized properties but this causes reduction in overall strength of the material.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof.

The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for obtaining topologically optimized structure in additive manufacturing, the method comprising:
   receiving, at a receiver module, a finite element mesh of a standard shape geometry encompassing desired structure to be topologically optimized in accordance with at least one design objective and orthotropic properties of material arising out of a selected material and a selected additive manufacturing process to be used for manufacturing the designed structure;
   applying, at an application module, an iterative topology optimization of the designing structure, wherein each iteration of the topology optimization comprises simulating one or more loading requirements, one or more design constraints and one or more boundary conditions under which the designing structure is designed and optimized;
   evaluating, at an evaluation module, the designing structure resulted from application of the iterative topology optimization using finite element analysis framework to obtain a predefined factor of safety based on an anisotropic properties of the material arising out of the selected additive manufacturing process, wherein the predefined factor of safety condition is defined as a substantially small difference in comparison with an evaluated factor of safety;
   modifying, at a modification module, a state of the finite element iteratively according to one or more changes of the factor of safety between two consecutive iterations of the iterative topology optimization of the designing structure, wherein the state of finite element is modified by removal or addition of the finite elements, wherein a mesh independency filter with one or more nodal variables is used to determine a utility number of the finite elements, and wherein modifying the state of the finite element by removal or addition of the finite elements is based on the utility number; and
   obtaining an optimal designing structure when the entire structure has a minimal factor of safety equivalent to the predefined factor of safety.

2. The method claimed in claim 1, wherein the method further applied to obtain optimal designed structures for one or more build orientations with information of respective anisotropic properties.

3. The method claimed in claim 2, wherein the one or more build orientations are ranked to obtain a build orientation when evaluated against one or more criteria.

4. The method claimed in claim 1, wherein the iterative topology optimization includes bidirectional evolutionary structural optimization (BESO).

5. A system for obtaining topologically optimized structure in additive manufacturing, the system comprising:
   a memory having one or more computer readable instructions;

at least one processor communicatively coupled with the memory, wherein the at least one processor executing one or more instructions stored in the memory;

a receiver module is configured to receive a finite element mesh of a standard shape geometry encompassing desired structure to be topologically optimized in accordance with at least one design objective and orthotropic properties of material arising out of a selected material and a selected additive manufacturing process to be used for manufacturing the designed structure;

an application module is configured to apply an iterative topology optimization of the designing structure, wherein each iteration of the topology optimization comprises simulating one or more loading requirements, one or more design constraints and one or more boundary conditions under which the designing structure is designed and optimized;

an evaluation module is configured to evaluate the designing structure resulted from application of the iterative topology optimization using finite element analysis framework to obtain a predefined factor of safety based on an anisotropic properties of the material arising out of the selected additive manufacturing process, wherein the predefined factor of safety condition is defined as a substantially small difference in comparison with evaluated factor of safety;

a modification module is configured to modify a state of the finite element iteratively according to one or more changes of the factor of safety between two consecutive iterations of the iterative topology optimization of the designing structure, wherein the state of finite element is modified by removal or addition of the finite elements, wherein a mesh independency filter with one or more nodal variables is used to determine a utility number of the finite elements, and wherein modifying the state of the finite element by removal or addition of the finite elements is based on the utility number; and obtaining an optimal designing structure when the entire structure has a minimal factor of safety equivalent to the predefined factor of safety.

6. The system claimed in claim 5, wherein the at least one design objective includes providing a predefined mass and stress for each of the finite elements of the designing structure.

7. The system claimed in claim 5, wherein the iterative topology optimization includes bidirectional evolutionary structural optimization (BESO).

8. A non-transitory computer readable medium storing one or more instructions which when executed by a processor on a system, cause the processor to perform method for obtaining topologically optimized structure in additive manufacturing comprising:

receiving, at a receiver module, a finite element mesh of a standard shape geometry encompassing desired structure to be topologically optimized in accordance with at least one design objective and orthotropic properties of material arising out of a selected material and a selected additive manufacturing process to be used for manufacturing the designed structure;

applying, at an application module, an iterative topology optimization of the designing structure, wherein each iteration of the topology optimization comprises simulating one or more loading requirements, one or more design constraints and one or more boundary conditions under which the designing structure is designed and optimized;

evaluating, at an evaluation module, the designing structure resulted from application of the iterative topology optimization using finite element analysis framework to obtain a predefined factor of safety based on an anisotropic properties of the material arising out of the selected additive manufacturing process, wherein the predefined factor of safety condition is defined as a substantially small difference in comparison with evaluated factor of safety;

modifying, at a modification module, a state of the finite element iteratively according to one or more changes of the factor of safety between two consecutive iterations of the iterative topology optimization of the designing structure, wherein the state of finite element is modified by removal or addition of the finite elements, wherein a mesh independency filter with one or more nodal variables is used to determine a utility number of the finite elements, and wherein modifying the state of the finite element by removal or addition of the finite elements is based on the utility number; and obtaining an optimal designing structure when the entire structure has a minimal factor of safety equivalent to the predefined factor of safety.

* * * * *